(No Model.)
C. M. BURGESS.
FASTENER FOR THE MEETING RAILS OF SASHES.
No. 465,158. Patented Dec. 15, 1891.
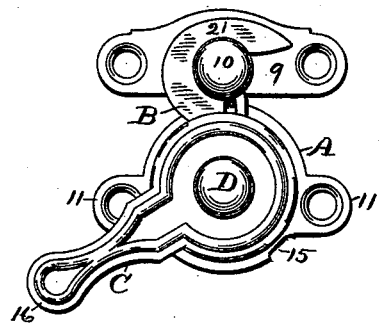
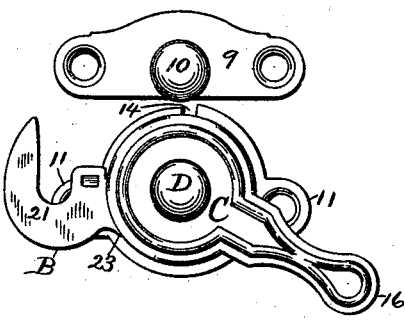
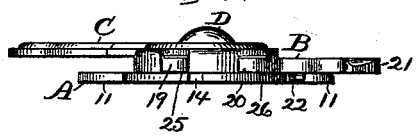
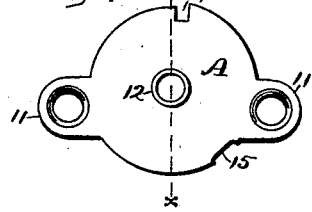
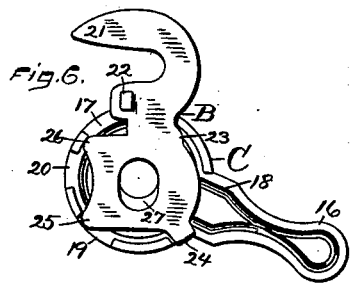
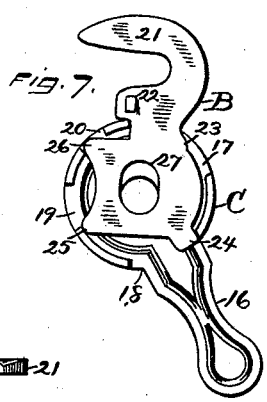
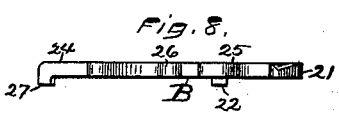
Witnesses.
John Edwards Jr.
W. H. Whiting.
Inventor
Charles M. Burgess.
By James Shepard
Atty.
THE NORRIS PETERS CO., PHOTO-LITHO., WASHINGTON, D. C.

UNITED STATES PATENT OFFICE.

CHARLES M. BURGESS, OF NEW BRITAIN, CONNECTICUT, ASSIGNOR TO THE RUSSELL & ERWIN MANUFACTURING COMPANY, OF SAME PLACE.

FASTENER FOR THE MEETING-RAILS OF SASHES.

SPECIFICATION forming part of Letters Patent No. 465,158, dated December 15, 1891.

Application filed May 29, 1891. Serial No. 394,583. (No model.)

*To all whom it may concern:*

Be it known that I, CHARLES M. BURGESS, a citizen of the United States, residing at New Britain, in the county of Hartford and State of Connecticut, have invented certain new and useful Improvements in Fasteners for the Meeting-Rails of Sashes, of which the following is a specification.

My invention relates to improvements in fasteners for the meeting-rails of sashes; and some of the objects of my improvement are to arrange the sliding latch for operation by external instead of internal cams, to simplify the construction, to make the fastener of sheet metal, if desired, and in general to improve the efficiency of the article and produce it at a small cost.

In the accompanying drawings, Figure 1 is a plan view of my fastener and keeper engaged with each other. Fig. 2 is a plan view of the same in an unlocked or disengaged position. Fig. 3 is a rear elevation of the same with the keeper removed. Fig. 4 is a detached plan view of the base-plate. Fig. 5 is a section thereof on line $x\,x$ of Fig. 4, together with an elevation of the central post or rivet. Fig. 6 is a reverse plan view of the sliding latch and its operating-lever in their locked position. Fig. 7 is a like view of the same in their unlocked position, and Fig. 8 is an edge view of the sliding latch as modified by the addition of a downwardly-projecting lug at the heel end.

The keeper is formed of a flat plate of sheet metal 9 and a headed post or pin 10 riveted thereto for being engaged by the hook of the sliding latch, as in ordinary fasteners of this class. The other part, or fastener proper, is formed of a base-plate A, sliding latch B, and lever C, the same being connected together by the central headed post or rivet D. The base-plate A is provided with perforated screw-hole lugs 11 and a central tubular boss 12, Figs. 4 and 5, which is formed by swaging or turning the metal in the central portion upwardly, as shown. The exterior of this tubular boss is of a diameter substantially equal to that of the body of the pin or post D under its head, while the reduced end of the post extends through said boss for riveting, the shoulder 13 at the junction of the body of the pin and its reduced portion resting on the edge of the metal at the end of said tubular boss, as shown in Fig. 5, whereby the pin is not only firmly supported within the base-plate when its end is riveted, but the cylindrical periphery of the central post upon which the sliding latch and lever work is formed partly of said pin D and partly of said boss.

The middle portion of the base-plate A is circular in plan view and is provided with a notch 14, one side wall of which projects a little farther than the opposite side wall, so that it forms a stop-shoulder. The side of the screw-hole lug 11, which is at the left of said notch when viewed as in Figs. 1, 2, and 4, also serves as a stop-shoulder. As shown, I also provide the base-plate with a shallow notch 15 at its outer edge, but which performs no function in the construction that I will first describe.

The operating-lever C is provided with a handle 16 and a hollow head or hub, by which it is pivoted on the post D and within which is the body of the sliding latch B. The head of this lever is provided on its side edge or flange with an opening 17, through which the body of the sliding latch B extends, an opening 18 for the heel of said latch, and openings 19 and 20 for the corner-cams of said latch. With the exception of the opening 18 the side walls thereof have the function of cams.

The latch B is provided with the usual hook 21 at its outer end for engaging the post of the keeper, a downwardly-projecting lug 22 for engaging the edge of the base-plate at its stop-shoulders and notch 14, a neck-cam 23 for being engaged by one of the side walls of the opening 17 in the head, a heel 24 for engaging by its side edges the sides of the opening 18 in the lever-head, and corner-cams 25 and 26 for being engaged by the metal in the head contiguous to the openings 19 and 20. Said latch is also provided with a slot 27, through which the hollow boss 12 and stud or post D pass and upon which the latch may slide a short distance out and in. This slot should also be wide enough to permit the latch to act, as hereinafter described, with a slight swinging movement as it slides longitudinally out and in the head of the lever.

The parts being formed as described and secured together by the post D, their operation is as follows: Suppose the parts to be in the position represented in Fig. 2. The handle 16 of the lever C is then turned downwardly to the left, and after the lever has moved a short distance one side wall of the opening 20 will strike or engage the corner-cam 26 and cause the latch B to move with said lever until its hook 21 meets the post of the keeper and the lug 22 engages the most projecting side wall of the slot 14, thereby limiting the further movement of the latch. The further movement of the lever brings one of the side walls of the opening 17 in the head against the neck-cam 23, thereby causing the latch to move longitudinally, so as to pull the keeper and base-plate together. In thus drawing in the latch the cam 26 bears upon the circular wall on the inside of the head to one side of the notch 20, while the cam 25 enters the notch or opening 19 and the heel 24 is brought up against one of the side walls of the opening 18, as shown in Fig. 6. The position of the parts in said figure corresponds with that of the parts shown in Fig. 1, while the position of the parts in Fig. 7 corresponds with that shown in Figs. 2 and 3. Upon the reverse movement of the lever and about as soon as the side wall of the opening 17 is out of the way of the neck-cam 23 one side wall of the opening 19 engages the corner-cam 25, which is diagonally opposite the cam 23, and thereby throws the latch outwardly, so that its lug 22 disengages the notch 14. The corner-cam 25 still rests against the side wall of the opening 19, and one side wall of the opening 17 also rests against the edge of the latch near its neck, thereby causing sufficient friction to carry the latch with the lever until the lug 22 is stopped against one of the screw-hole lugs 11, and the parts are brought into the position shown in Fig. 7, with the corner-cam 26 resting in the opening 20 and the corner-cam 25 bearing on the inner circular wall of the head immediately to one side of the opening 19, as shown.

If desired, the heel of the latch 24 may be elongated slightly and provided with a downwardly-projecting lug, as at 27, Fig. 8, so that as the latch is brought into the position shown in Fig. 7 said lug will be forced a short distance into the notch 15 of the base-plate A and lock the latch in its disengaged position, when it can only be moved by moving the lever.

If desired, the head of the lever might be made slightly deeper and a friction-spring confined within the head of said lever to bear upon the broad side of the latch to make them move together by friction; but such friction-spring is not necessary, and, furthermore, it is a well-known device in sash-fasteners for this purpose.

The base-plate is punched and swaged from sheet metal. So, also, is the lever, and the latch is formed by cutting out with dies from a sheet or plate of metal.

The lug 22 may be formed in any desired manner; but for cheapness of construction I prefer to form the same with a die and punch, which cut the lug 22 from the body of the latch and project the punching or slug thus cut partly through the metal to one side thereof without punching it clear out, thereby cheaply forming the lug; but such a method of forming a stud or lug of a punching or slug and leaving it in the metal from which it is cut is old in the art of metal-working generally, although to my knowledge it has not been employed in sash-fasteners.

While it is evident that substantially the same form of parts may be made of cast metal, they are particularly adapted for being made from sheet metal, thereby reducing the cost, and also giving such uniformity to the shape of the parts as to make their operation more efficient and certain.

I am aware that locking sash-fasteners having a sliding latch in the head of a swinging lever are old, and I hereby disclaim the same.

I claim as my invention—

1. The herein-described sash-fastener, consisting of a base-plate, a lever pivoted thereto and provided with a hollow head, and a sliding latch with its body portion within said head, the outer edge of said latch and the side edge of said lever-head being provided with engaging cams, substantially as described, and for the purpose specified.

2. The combination of the base-plate A, having the notch 14 and a pair of stops, the lever pivoted to said base-plate and having a hollow head provided with side openings, and the sliding latch B, having lug 22 and cams at the outer edge of that part of the latch which is engaged by said head, substantially as described, and for the purpose specified.

3. The herein-described sheet-metal sash-fastener, consisting of the sheet-metal base-plate, of a flat-plate form, outside of its center, the sheet-metal lever pivoted thereto and consisting of a handle 16 and integral hollow head or hub having the struck-up or turned-over side edge or flange, and the sliding latch in the form of a flat plate, said latch and head of the lever being provided with engaging cams, substantially as described, and for the purpose specified.

4. In a sash-fastener, the central part or rivet having under its head a shouldered body, and the base-plate A, having the tubular boss 12, the diameter of which is substantially equal to that of the body of said pin or post under its head, the shoulder 13 at the junction of the body and reduced portion of said pin resting on the edge of the metal at the end of the said tubular boss, whereby the cylindrical periphery of the central post or pin is formed partly of said pin and partly of said boss, substantially as described.

CHARLES M. BURGESS.

Witnesses:
THEO. E. SMITH,
M. S. WIARD.